US012589879B2

(12) United States Patent
Pautis et al.

(10) Patent No.: US 12,589,879 B2
(45) Date of Patent: Mar. 31, 2026

(54) PROPULSIVE ASSEMBLY WITH ENHANCED ENGINE COWL ARTICULATED IN ROTATION ON AN AXIS OF ROTATION POSITIONED ABOVE TOP FACE OF ENGINE PYLON, AND AIRCRAFT COMPRISING SUCH AN ASSEMBLY

(71) Applicant: Airbus Operations (S.A.S.), Toulouse (FR)

(72) Inventors: Olivier Pautis, Toulouse (FR); Jérôme Colmagro, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 95 days.

(21) Appl. No.: 18/633,696

(22) Filed: Apr. 12, 2024

(65) Prior Publication Data

US 2025/0361019 A1      Nov. 27, 2025

(30) Foreign Application Priority Data

Apr. 14, 2023    (FR) ...................................... 2303762

(51) Int. Cl.
　　　*B64D 29/06*　　　　(2006.01)
　　　*B64D 29/08*　　　　(2006.01)
(52) U.S. Cl.
　　　CPC ............. *B64D 29/06* (2013.01); *B64D 29/08* (2013.01)
(58) Field of Classification Search
　　　CPC ................................ B64D 29/08; B64D 29/06
　　　See application file for complete search history.

(56) References Cited

U.S. PATENT DOCUMENTS

| | | | | |
|---|---|---|---|---|
| 2,550,337 | A | * | 4/1951 | Duffendack, Jr. ..... B64D 29/08 |
| | | | | 123/41.7 |
| 9,221,545 | B2 | * | 12/2015 | Popescu ................. B64D 29/08 |
| 9,604,728 | B2 | * | 3/2017 | Fabre ..................... B64D 29/08 |
| 2011/0038725 | A1 | | 2/2011 | Soulier |
| 2014/0301835 | A1 | | 10/2014 | Popescu |
| 2020/0182194 | A1 | | 6/2020 | Journade |

FOREIGN PATENT DOCUMENTS

| | | | | |
|---|---|---|---|---|
| EP | 2792597 | A1 * | 10/2014 | ............. B64D 29/06 |
| GB | 724052 | A | 2/1955 | |

OTHER PUBLICATIONS

French Search Report for Application No. 2303762 dated Oct. 19, 2023.

* cited by examiner

*Primary Examiner* — Richard Green
(74) *Attorney, Agent, or Firm* — KDW Firm PLLC

(57) ABSTRACT

An aircraft propulsive assembly including an engine pylon having a top face, an internal engine part, a possible fixed top cowling of the engine pylon and at least one engine cowl articulated in rotation on an axis of rotation defined by at least two articulation hinges. The axis of rotation of the at least two articulation hinges is positioned above the top face of the engine pylon. It is possible to assemble a nacelle fairing around the internal part of the engine, in the absence of the external part composed of the fan fairing, and without modifying the structure of the engine pylon except with respect to the arrangement of the hinge fittings of the movable engine cowls.

3 Claims, 3 Drawing Sheets

PROPULSIVE ASSEMBLY WITH ENHANCED ENGINE COWL ARTICULATED IN ROTATION ON AN AXIS OF ROTATION POSITIONED ABOVE TOP FACE OF ENGINE PYLON, AND AIRCRAFT COMPRISING SUCH AN ASSEMBLY

TECHNICAL FIELD

The disclosure herein relates to an aircraft propulsive assembly comprising an enhanced aircraft engine cowling device. The disclosure herein relates more particularly to an arrangement of hinges and of one or more hinge axes of at least one engine cowl of an aircraft propulsive assembly.

BACKGROUND

Many aircraft are equipped with turbofan engines comprising an internal part, which comprises a primary duct of a power turbine, and an external part which comprises a bypass duct around the power turbine. In such a configuration, the internal and external parts are arranged concentrically with respect to one another, the internal part being arranged internally to the external part, and the latter being therefore arranged peripherally to the internal part. An engine pylon makes it possible to fix such a turbofan engine under the wing of the aircraft which is equipped therewith, and an engine fairing, composed of fixed cowls and of removable or articulated cowls, surrounds most of these elements for the purposes of protection and so as to obtain good aircraft aerodynamic performance levels. Access to the elements of an engine is necessary to the performance of assembly, checking and maintenance operations and articulated engine cowls are arranged so as to be able to be easily opened or closed. Very often, the movable engine cowls are articulated around hinges. The hinges are primarily arranged by an assembly of fittings around a pin. The fittings of a movable cowl are often arranged in the form of a "swan neck" to offer an offset allowing an advantageous trajectory of a movable cowl with respect to the fixed elements of the assembly.

Engine architectures have been designed and produced, notably for the purposes of lightening weight, enhancing performance and reducing carbon emissions. One of these recent architectures is said to be of "turboprop engine" type, and corresponds to an engine assembly having a non-faired fan in which the fan fixed directly to the power turbine (internal part of the turbofan engine) is arranged outside of the nacelle, the nacelle then comprising only the internal part, around the primary flow. The overall form of an engine of turboprop type is therefore different from that of a turbofan engine as mentioned above and the engine fairing assembly is consequently also different, which entails structural modifications, notably for the arrangement of the cowls, and in particular of the articulated cowls of an engine.

There is therefore a need to arrange these different elements of an aircraft propulsive assembly of turboprop engine type without having to modify structural elements like the main structure of the engine pylon, for example, and the fixing of the engine pylon under the wings or by minimally modifying these elements.

SUMMARY

One object of the disclosure herein is to offer arrangement possibilities that limit to the maximum the structural modifications of an aircraft with a view to fixing engines of turboprop type under the wings.

To this end, an aircraft propulsive assembly is proposed comprising an engine pylon having an overall box form and a top face, an internal engine part, and at least one engine cowl that is articulated in rotation on an axis of rotation, defined by at least two articulation hinges, the aircraft propulsive assembly being configured such that the axis of rotation of the at least two articulation hinges of the articulated engine cowl is positioned above the top face of the engine pylon.

The aircraft propulsive assembly according to the disclosure herein can further comprise the following features, considered alone or in combination:

The propulsive assembly further comprises a second engine cowl respectively articulated in rotation about a second axis of rotation defined by at least two other articulation hinges and positioned above the top face.

The two axes of rotation of the engine cowls of the propulsive assembly are disposed parallel to one another.

The two axes of rotation of the engine cowls coincide to form only a single axis of rotation about which the two engine cowls are articulated.

The two axes of rotation of the engine cowls are not parallel and have an opening angle less than twenty degrees.

Another subject of the disclosure herein is an aircraft comprising at least one aircraft propulsive assembly as previously described.

BRIEF DESCRIPTION OF THE DRAWINGS

The features of the disclosure herein mentioned above, and others, will become more clearly apparent on reading the following description of an example embodiment, the description being given in relation to the attached drawings.

DETAILED DESCRIPTION

Figure 1:
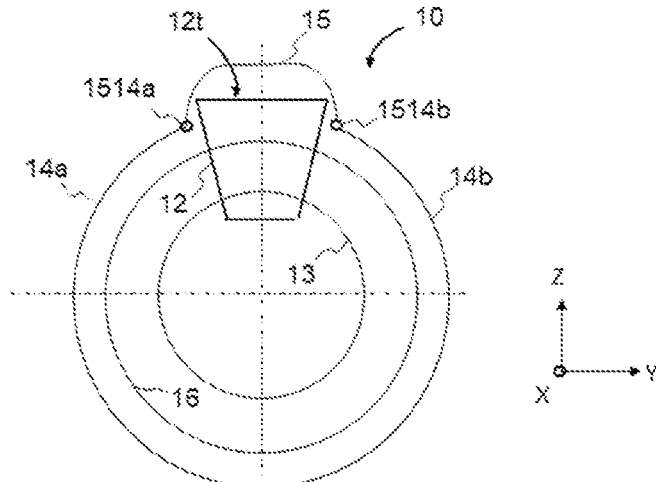
FIG. 1 schematically and symbolically illustrates a cross-section of an aircraft turbofan engine propulsive assembly, seen from the front, in a configuration according to which articulated lateral engine cowls are closed.

An aircraft turbofan engine arrangement is described symbolically, seen from the front, in relation to FIG. 1. This arrangement comprises an engine pylon 12, boxed, configured for a turbofan engine and its turbofan engine fairing to be fixed under the wing. The term fairing here denotes the set of the cowling elements and possible casings which form the outer aerodynamic profile of the engine. The assembly thus arranged (the engine, its fairing and the engine pylon) is here called aircraft propulsive assembly 10. The central longitudinal axis of the aircraft propulsive assembly 10 is parallel to a reference axis X. An axis Y at right angles to the axis X defines a transverse direction and an axis Z, at right angles to the axis X and to the axis Y, defines a vertical direction whose abscissa values increase upwards. Such an orthonormal reference frame X, Y, Z is conventionally used as reference with respect to the mechanical arrangement of aircraft and in particular of aeroplanes when they are placed on a ground considered to be horizontal (for the definition of the vertical axis Z).

Figure 2:
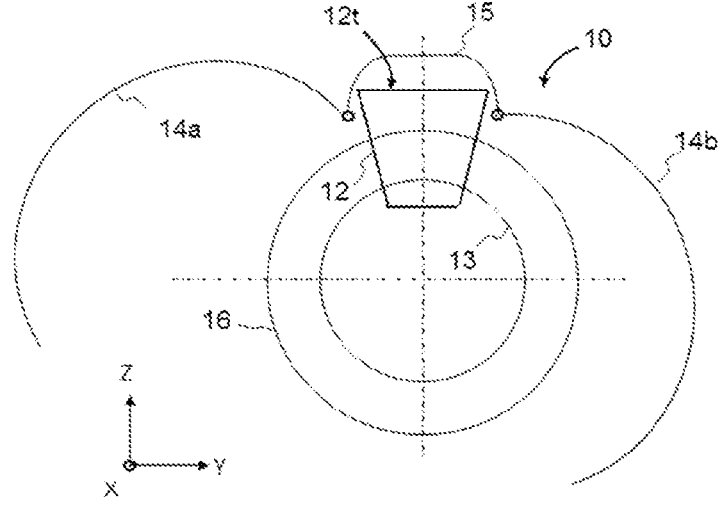
FIG. 2 schematically and symbolically illustrates a cross-section of the aircraft turbofan engine propulsive assembly already represented in FIG. 1 in a configuration according to which the articulated lateral engine cowls are open.

The aircraft propulsive assembly 10 comprises the engine pylon 12 which bears internal 13 and external 16 parts of the aircraft turbofan engine represented. The engine pylon 12 is a so-called "boxed" pylon inasmuch as it has an overall box form, as opposed to a pylon structure in lattice form. The internal 13 and external 16 parts of the turbofan engine are arranged concentrically with respect to one another. According to one embodiment, the top part of the engine pylon 12 is covered with a fixed top cowling 15. According to a variant (represented in FIG. 7 for an engine of turboprop type but which would still be valid for a turbofan engine), the fixed top cowling 15 does not exist and the "inner" edges of lateral removable engine cowls are arranged edge-to-edge or separated by a single gap, in the top part of the propulsive assembly 10. According to the example embodiment represented in FIG. 1, the internal 13 and external 16 parts of the aircraft propulsive assembly 10 are covered by two articulated engine cowls 14a and 14b. The articulated engine cowl 14a is arranged on one side of the engine with respect to the central longitudinal axis of the engine, and the articulated cowl 14b is arranged on the other side of the central longitudinal axis, with respect to the articulated engine cowl 14a. Thus, it is possible to access internal elements of the aircraft propulsive assembly 10 from both lateral sides of the engine. The engine cowl 14a is articulated in rotation about an axis of rotation (or articulation axis) defined by at least two hinges 1514a, and therefore by hinge fittings bearing these hinges 1514a. The engine cowl 14b is articulated in rotation about an axis of rotation (or articulation axis) defined by at least two hinges 1514b, and therefore by hinge fittings bearing these hinges 1514b. The engine pylon 12 comprises a top face 12t. The term top face here denotes an upper face, or else a face oriented in the direction of the abscissa values increasing on the vertical axis Z. Concerning a boxed pylon, that is to say one which has an overall box form, the top face 12t is defined by the form of the top spar of the primary structure box of the engine pylon 12. According to one embodiment, three hinges 1514a and three hinges 1514b (the respective positions of which are defined by hinge fittings bearing them) respectively define axes of rotation 1514' and 1514" (visible in FIG. 5b) of the articulated engine cowls 14a and 14b. FIG. 2 illustrates the aircraft propulsive assembly 10 when the articulated engine cowls 14a and 14b of the aircraft propulsive assembly 10 are in open position. According to the example illustrated, the engine cowl 14a is completely open and the engine cowl 14b is open in an intermediate or "semi-open" position.

Figure 3:
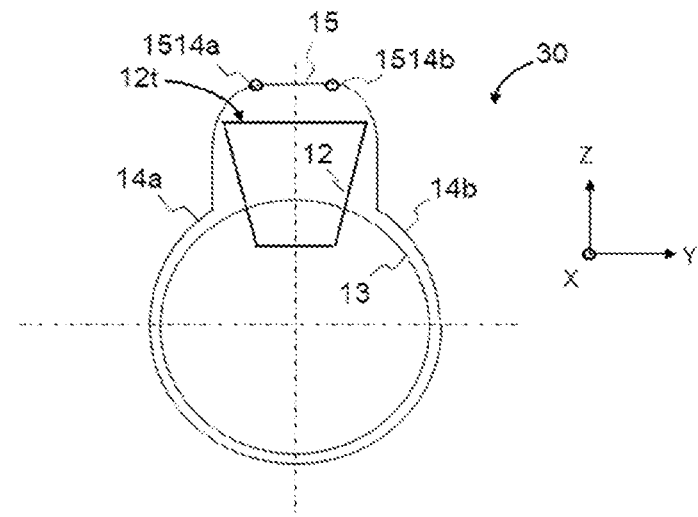
FIG. 3 schematically and symbolically illustrates a cross-section of an aircraft propulsive assembly of turboprop engine type in a configuration according to which the articulated lateral engine cowls are closed.
Figure 4:
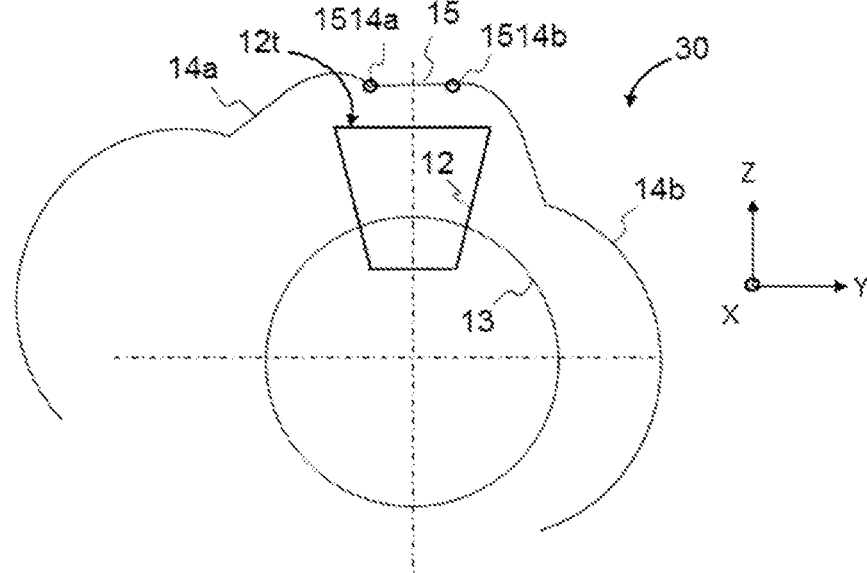
FIG. 4 schematically and symbolically illustrates a cross-section of the aircraft propulsive assembly of turboprop engine type already represented in FIG. 3 in a configuration according to which the articulated lateral engine cowls are open.

An aircraft propulsive assembly 30, of turboprop engine type, is described in relation to FIG. 3, according to one embodiment. This turboprop engine architecture differs notably from the turbofan engine architecture described previously by virtue of an absence of fan fairing, hereinabove denoted the external part 16 of the propulsive assembly. Thus, the bypass duct of the engine is open to any outer engine fairing, fixed engine cowl or articulated engine cowl, and these elements are arranged directly around the internal part 13 of the aircraft propulsive assembly 30. Shrewdly and advantageously, the hinges and therefore the axes of rotation of the engine cowls 14a and 14b are positioned above the top surface 12t of the engine pylon 12, that is to say above a surface defined by the form of the top spar of the box of the engine pylon 12. Thus, the fairing portions that are substantially vertical and lateral to the engine pylon 12 are included in the articulated engine cowls 14a and 14b, and it is possible to arrange the articulated engine cowls by retaining the overall architecture of the engine pylon 12 and by satisfying the engine fairing (or cowling) constraints specific to the form of the internal part 13 of the aircraft propulsive assembly 30. Such an arrangement further avoids any conflicts in the positioning of certain movable elements of the articulated engine cowls 14a and 14b (for example swanneck fittings) with fixed elements present. FIG. 4 illustrates the aircraft propulsive assembly 30 when the engine cowls 14a and 14b of the aircraft propulsive assembly 30 are in open position. According to the example illustrated, the articulated engine cowl 14a is completely open and the articulated engine cowl 14b is open in an intermediate or semi-open position.

Figure 5A:
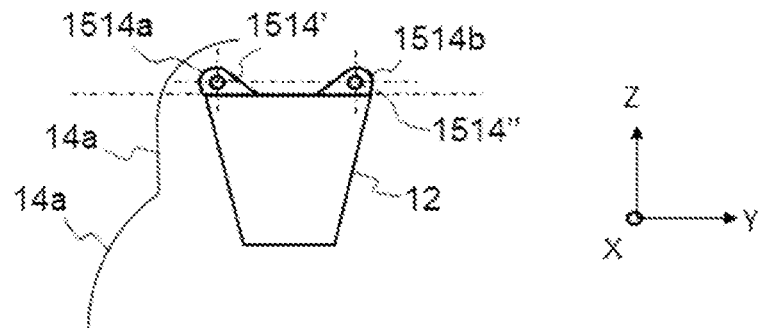
FIG. 5a describes an arrangement of cowl hinge fittings of an aircraft propulsive assembly of turboprop engine type, according to a first embodiment.
Figure 5B:
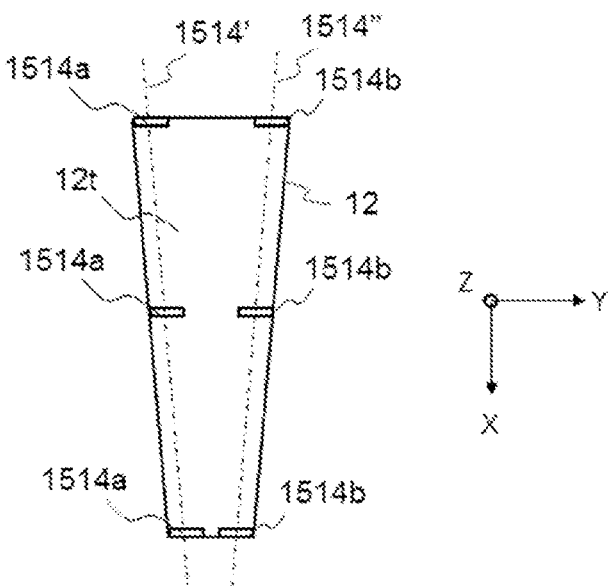
FIG. 5b describes the arrangement of cowl hinge fittings already represented in FIG. 5a, seen from above.

FIG. 5a illustrates a positioning of the hinges 1514a and 1514b and therefore of the hinge axes 1514' and 1514" above the face 12t of the engine pylon, according to an arrangement of the hinge fittings, according to a first embodiment. FIG. 5b symbolically and in a top view illustrates this positioning of the hinges 1514a and 1514b and therefore of the hinge axes 1514' and 1514" above the face 12t of the engine pylon. According to this arrangement, the axes 1514' and 1514" of rotation of the engine cowls are not parallel to one another when the lateral faces of the engine pylon 12 are not parallel to one another (which is the case according to the example implementation illustrated in FIG. 5b). Indeed, according to this configuration, the hinge fittings 1514a and 1514b are respectively arranged on the top face 12t of the engine pylon 12 towards the outside, that is to say by being close to the edges which respectively delimit the top face 12t with each of the two lateral faces of the engine pylon 12.

For the purposes of simplification, FIG. 5a represents only the engine cowl 14a. The same applies for FIG. 6 and FIG. 7.

Figure 6:
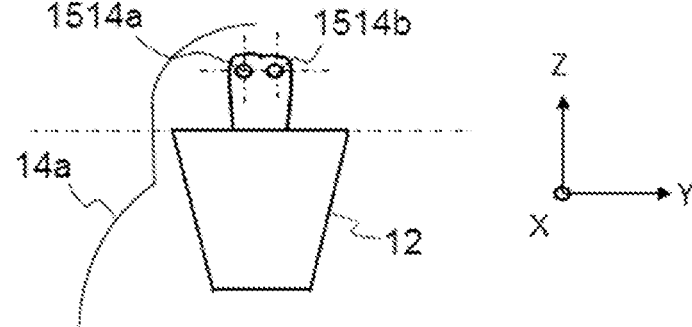
FIG. 6 describes an arrangement of cowl hinge fittings of an aircraft propulsive assembly of turboprop engine type, according to a second embodiment.

FIG. 6 illustrates a positioning of the hinges and therefore of the hinge axes above the face 12t of the engine pylon, according to an arrangement of the hinge fittings according to a second embodiment. According to this second embodiment, the hinges 1514a and 1514b are brought closer in the central part of the top surface 12t of the engine pylon 12, in a higher position than according to the embodiment previously described in relation to FIG. 5a. Advantageously, a higher position, characterized by a greater distance with a predetermined threshold value between each of the axes of rotation of the articulated engine cowls 14a and 14b and the top face of the engine pylon 12t, makes it possible to be positioned as close as possible to the aerodynamic skin and avoid conflicts of positioning between the articulated movable elements and the fixed parts present while retaining the overall architecture of the engine pylon 12. The expression "overall architecture of the engine pylon 12" here denotes the form and the dimensions of the structure of the engine pylon relating notably to the primary structure of the aircraft, and excluding the hinge fittings of the articulated engine cowls.

Figure 7:
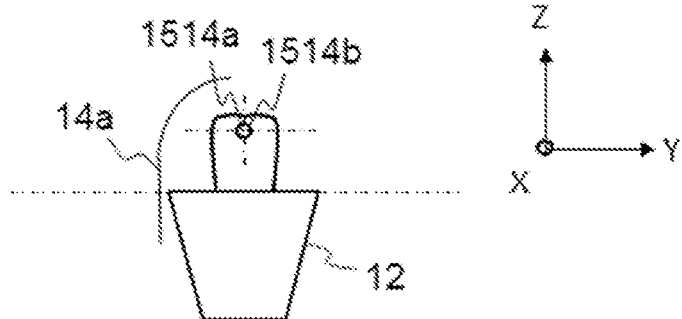
FIG. 7 describes an arrangement of cowl hinge fittings of an aircraft propulsive assembly of turboprop engine type, according to a third embodiment.

FIG. 7 illustrates a positioning of the hinges 1514*a* and 1514*b*, and therefore of the hinge axes 1514' and 1514", above the face 12*t* of the engine pylon, according to an arrangement of the hinge fittings according to a third embodiment. According to this third embodiment, the two hinge axes (or axes of rotation of the articulated engine cowls 14*a* and 14*b*) coincide to form only a single common articulation axis for the two engine cowls 14*a* and 14*b*. Advantageously, it is thus possible to dispense with the use of the fixed top cowling 15 as implemented according to the embodiments described in relation to FIG. 1, FIG. 2, FIG. 3 and FIG. 4.

Figure 8:
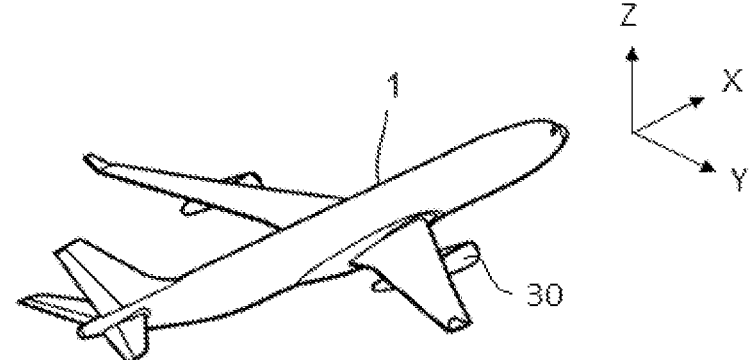
FIG. 8 describes an aircraft comprising at least one aircraft propulsive assembly as represented in FIG. 3 and FIG. 4.

FIG. 8 illustrates an aircraft 1 advantageously comprising at least one propulsive assembly 30.

Obviously, and regardless of the embodiment, the articulated engine cowls 14*a* and 14*b*, and the fixed top cowling 15 (when it is present) can be matched with sealing elements configured to ensure a seal-tightness between the inside and the outside of the cowling, when the articulated engine cowls 14*a* and 14*b* are closed, for example engine cowl border seals.

While at least one example embodiment of the invention(s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft propulsive assembly comprising:
   an engine pylon having a box form, such that the engine pylon is a boxed pylon, and a top face;
   an internal engine part;
   a first engine cowl; and
   a second engine cowl;
   wherein the first and second engine cowls are each articulated in rotation on a single axis of rotation that is defined by at least two articulation hinges;
   wherein the single axis of rotation is above the top face of the engine pylon;
   wherein the first engine cowl and the second engine cowl each comprise an inner lateral edge, respectively, which are disposed edge-to-edge with each other above the engine pylon.

2. The propulsive assembly according to claim 1, wherein the first and second engine cowls each have an opening angle of less than twenty degrees.

3. An aircraft comprising at least one of the propulsive assembly of claim 1.

* * * * *